(12) United States Patent
Richardson et al.

(10) Patent No.: US 9,098,238 B2
(45) Date of Patent: Aug. 4, 2015

(54) ENERGY DEFLECTION CASE

(75) Inventors: Curtis Richardson, Fort Collins, CO (US); Jamie Johnson, Fort Collins, CO (US); Adam Wibby, Fort Collins, CO (US); Alan Morine, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 405 days.

(21) Appl. No.: 13/050,826

(22) Filed: Mar. 17, 2011

(65) Prior Publication Data

US 2011/0228459 A1 Sep. 22, 2011

Related U.S. Application Data

(60) Provisional application No. 61/314,955, filed on Mar. 17, 2010, provisional application No. 61/417,254, filed on Nov. 25, 2010.

(51) Int. Cl.

| | |
|---|---|
| *G06F 1/16* | (2006.01) |
| *B65D 85/00* | (2006.01) |
| *H01H 9/04* | (2006.01) |
| *H04M 1/18* | (2006.01) |
| *A45F 5/00* | (2006.01) |

(52) U.S. Cl.
CPC .............. *G06F 1/1628* (2013.01); *H01H 9/04* (2013.01); *H04M 1/185* (2013.01); *A45F 5/00* (2013.01)

(58) Field of Classification Search
CPC ............ G06F 1/1628; H01H 9/04; A45F 5/00
USPC ............ 361/679.01–679.45, 679.55–679.59; 206/320; 312/223.1, 223.2; 455/575.1, 455/575.8
See application file for complete search history.

(56) References Cited

U.S. PATENT DOCUMENTS

| | | | |
|---|---|---|---|
| 4,097,878 | A | 6/1978 | Cramer |
| 4,584,718 | A | 4/1986 | Fuller |
| 4,703,161 | A | 10/1987 | McLean |
| 4,733,776 | A | 3/1988 | Ward |
| 4,762,227 | A | 8/1988 | Patterson |

(Continued)

FOREIGN PATENT DOCUMENTS

| | | |
|---|---|---|
| JP | 2008018637 | 1/1996 |
| WO | 9400037 A | 1/1994 |
| WO | 9941958 A | 8/1999 |

*Primary Examiner* — Nidhi Thaker

(57) ABSTRACT

A protective case for an electronic device may have flexible components in impact areas, such as corners of the case, where the case may be designed to flex. In many embodiments, a gap may exist between the protective case and the electronic device, and impact to the case may be absorbed by the protective case before damaging the electronic device. In some embodiments, the protective case may be manufactured from a two shot molding process where a hard plastic case may have overmolded thermoplastic elastomer. Some embodiments may have two case portions that may be joined to enclose a device. Other embodiments may be a single case that snaps over a device. Still other embodiments may be a permanently attached cover that attaches using fasteners or snap features.

6 Claims, 11 Drawing Sheets

(56) References Cited

U.S. PATENT DOCUMENTS

| | | | |
|---|---|---|---|
| 4,836,256 A | 6/1989 | Meliconi | |
| 5,025,921 A | 6/1991 | Gasparaitis et al. | |
| 5,123,044 A | 6/1992 | Tate | |
| 5,175,873 A | 12/1992 | Goldenberg et al. | |
| 5,368,159 A | 11/1994 | Doria | |
| 5,380,968 A | 1/1995 | Morse | |
| 5,383,091 A | 1/1995 | Snell | |
| 5,388,691 A | 2/1995 | White | |
| 5,388,692 A | 2/1995 | Withrow et al. | |
| 5,508,479 A | 4/1996 | Schooley | |
| 5,648,757 A | 7/1997 | Vernace et al. | |
| 6,068,119 A | 5/2000 | Derr et al. | |
| 6,073,770 A * | 6/2000 | Park | 206/522 |
| 6,304,459 B1 | 10/2001 | Toyosato et al. | |
| 6,317,313 B1 | 11/2001 | Mosgrove et al. | |
| 6,349,824 B1 | 2/2002 | Yamada | |
| 6,375,009 B1 * | 4/2002 | Lee | 206/522 |
| 6,445,577 B1 | 9/2002 | Madsen et al. | |
| 6,456,487 B1 | 9/2002 | Hetterick | |
| 6,471,056 B1 | 10/2002 | Tzeng | |
| 6,519,141 B2 | 2/2003 | Tseng et al. | |
| 6,536,589 B2 | 3/2003 | Chang | |
| 6,616,111 B1 | 9/2003 | White | |
| 6,625,394 B2 | 9/2003 | Smith et al. | |
| 6,626,362 B1 | 9/2003 | Steiner et al. | |
| 6,701,159 B1 | 3/2004 | Powell | |
| 6,781,825 B2 | 8/2004 | Shih et al. | |
| 6,980,777 B2 | 12/2005 | Shepherd et al. | |
| 7,050,841 B1 | 5/2006 | Onda | |
| 7,194,291 B2 | 3/2007 | Peng | |
| 7,216,763 B2 | 5/2007 | Gormick et al. | |
| 7,343,184 B2 | 3/2008 | Rostami | |
| 7,359,184 B2 | 4/2008 | Lord | |
| D574,819 S | 8/2008 | Andre et al. | |
| D575,056 S | 8/2008 | Tan | |
| D581,155 S | 11/2008 | Richardson et al. | |
| D581,421 S | 11/2008 | Richardson et al. | |
| 7,448,495 B2 | 11/2008 | Sadow | |
| D582,149 S * | 12/2008 | Tan | D3/218 |
| D587,008 S | 2/2009 | Richardson et al. | |
| D589,016 S | 3/2009 | Richardson et al. | |
| D593,319 S | 6/2009 | Richardson et al. | |
| 7,555,325 B2 | 6/2009 | Goros | |
| D597,089 S | 7/2009 | Khan et al. | |
| D603,603 S | 11/2009 | Laine et al. | |
| D606,751 S | 12/2009 | Andre et al. | |
| 7,663,879 B2 | 2/2010 | Richardson et al. | |
| D622,716 S | 8/2010 | Andre et al. | |
| D623,180 S | 9/2010 | Diebel | |
| D624,532 S | 9/2010 | Huskinson | |
| D624,908 S | 10/2010 | Huskinson | |
| D624,909 S | 10/2010 | Huskinson | |
| 8,050,022 B2 | 11/2011 | Mcintyre | |
| 8,204,561 B2 | 6/2012 | Mongan et al. | |
| 8,245,842 B2 * | 8/2012 | Bau | 206/320 |
| 8,584,847 B2 * | 11/2013 | Tages et al. | 206/320 |
| 2002/0065054 A1 | 5/2002 | Humphreys et al. | |
| 2002/0079244 A1 | 6/2002 | Kwong | |
| 2002/0085342 A1 | 7/2002 | Chen et al. | |
| 2002/0086702 A1 | 7/2002 | Lai et al. | |
| 2003/0151890 A1 | 8/2003 | Huang et al. | |
| 2004/0014506 A1 | 1/2004 | Kemppinen | |
| 2005/0247584 A1 | 11/2005 | Lu | |
| 2006/0255493 A1 | 11/2006 | Fouladpour | |
| 2006/0274493 A1 * | 12/2006 | Richardson et al. | 361/683 |
| 2007/0071423 A1 | 3/2007 | Fantone et al. | |
| 2007/0115387 A1 | 5/2007 | Ho | |
| 2007/0138920 A1 | 6/2007 | Austin et al. | |
| 2007/0158220 A1 | 7/2007 | Cleereman et al. | |
| 2009/0283184 A1 | 11/2009 | Han | |
| 2010/0006468 A1 * | 1/2010 | Lin | 206/522 |
| 2010/0072334 A1 * | 3/2010 | Le Gette et al. | 248/176.3 |
| 2010/0104814 A1 | 4/2010 | Richardson et al. | |
| 2010/0203931 A1 * | 8/2010 | Hynecek et al. | 455/575.8 |
| 2011/0073608 A1 | 3/2011 | Richardson et al. | |
| 2011/0157800 A1 | 6/2011 | Richardson et al. | |

\* cited by examiner

ENERGY DEFLECTION CASE

CROSS REFERENCE TO RELATED APPLICATIONS

This application is a non-provisional of Application Ser. No. 61/314,955, filed 17 Mar. 2010 entitled "Energy Deflection Case" and is a non-provisional of Application Ser. No. 61/417,254, filed 25 Nov. 2010 entitled "Energy Deflection Case", the entire contents of the applications are hereby specifically incorporated herein by reference for all they disclose and teach.

BACKGROUND

Electronic devices, such as cell phones, tablet computers, laptop computers, and the like may be very expensive and sensitive to impact. In many cases, these devices may be used in harsh environments where the devices may be subject to dropping or other impact.

SUMMARY

A protective case for an electronic device may have flexible components in impact areas, such as corners of the case, where the case may be designed to flex. In many embodiments, a gap may exist between the protective case and the electronic device, and impact to the case may be absorbed by the protective case before damaging the electronic device. In some embodiments, the protective case may be manufactured from a two shot molding process where a hard plastic case may have overmolded thermoplastic elastomer. Some embodiments may have two case portions that may be joined to enclose a device. Other embodiments may be a single case that snaps over a device. Still other embodiments may be a permanently attached cover that attaches using fasteners or snap features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A protective case for an electronic device may have flexible components that may be designed to flex when impacted. The flexing action may absorb some of the impact energy and protect the electronic device from damage. The flexing action may be bending, torsion, or combination of bending and torsion that may absorb impact energy.

The protective case may be designed with a gap between the internal surface of the protective case and the electronic device. The gap may allow the protective case to flex inwardly during an impact.

The protective case may operate by absorbing impact energy by an elastic spring action. In some embodiments, the protective case may cause an electronic device to bounce when dropped. In many cases, the elastic absorption of energy may soften or lessen the impact energy transmitted to the electronic device.

The protective case may be a removable case that may be installed by a consumer as an aftermarket accessory. In such embodiments, the protective case may be a single piece design that may snap over an electronic device. In some embodiments, the protective case may be constructed of two or more components that may be joined by snapping, fastening, or other attachment mechanism.

In some embodiments, the protective case may be a permanent case that may not be removable by a user. In such embodiments, the protective case may be attached to the electronic device by fastening, ultrasonic welding, snaps, or other mechanisms which may or may not be removable.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
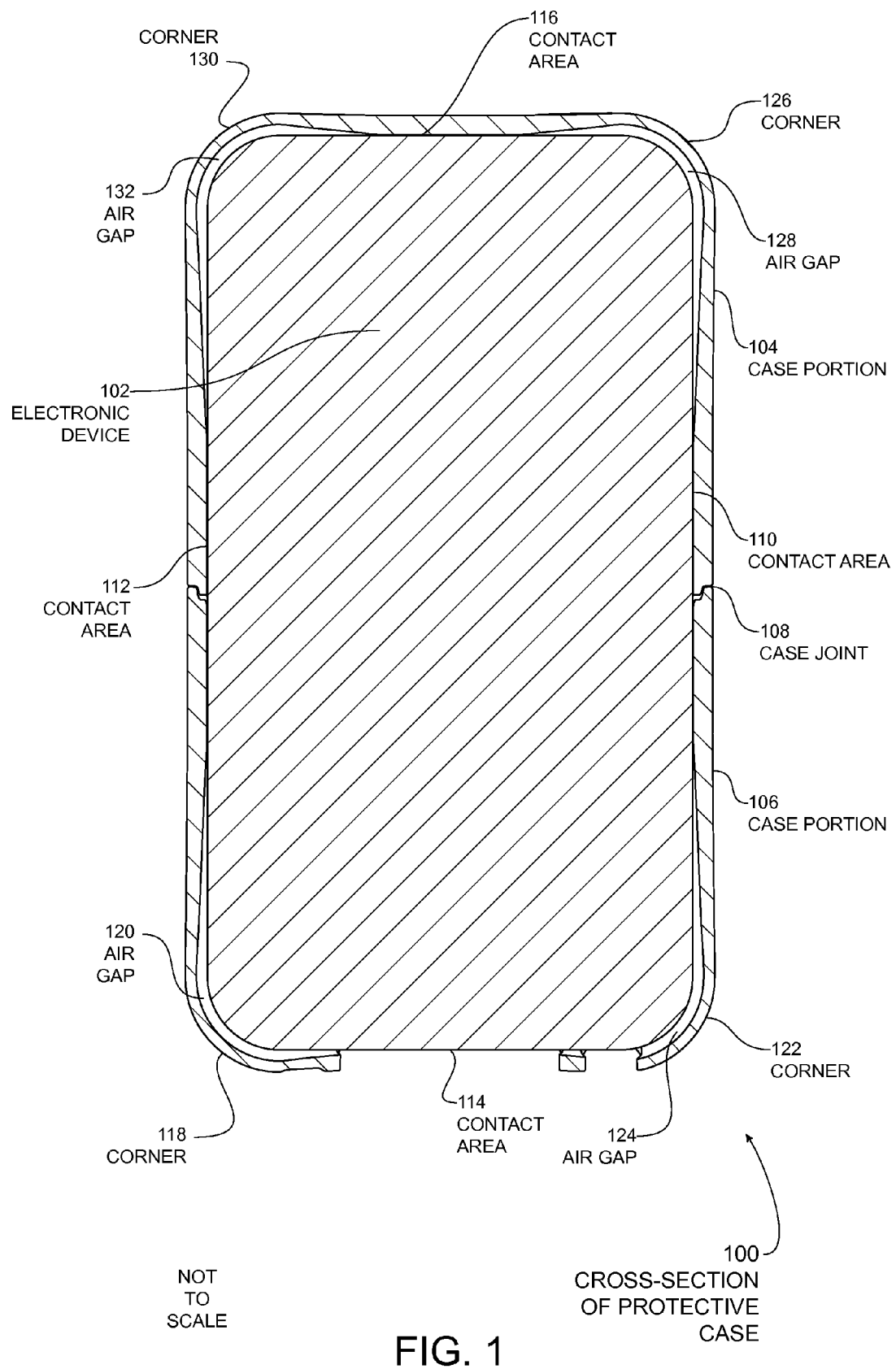
FIG. 1 is a cross-sectional illustration of an embodiment showing a protective case.

FIG. 1 is a cross sectional diagram of an embodiment 100, showing a protective case. FIG. 1 is not to scale. Embodiment 100 illustrates an example of a protective case that may have gaps in the corner areas. The gaps may be designed to allow the protective case to deflect during impact and absorb some impact energy.

Embodiment 100 illustrates a protective case where the case may be designed to deflect during impact. The deflection may absorb some impact energy in an elastic or plastic manner and may lessen the amount of energy transmitted to a device enclosed by the case.

The deflection of the protective case may be bending or torsional forces acting on elements of the protective case. In many embodiments, fingers or other features may extend away from the device and may be subject to bending or torsion during impact. Such embodiments may have a gap between the protective case and the device, and the gap may permit the features to move in the direction away from the impact force while absorbing energy prior to contact with the device.

The deflection of the protective case may be designed to be within the elastic strain region for the protective case. In such embodiments, the protective case may be able to absorb the same amount of impact energy repeatedly without degrading performance. Using conventional molded plastic materials, many protective case designs may operate within the elastic strain region for standardized drop tests.

In the case of plastic deformation of the protective case, the impact may permanently deform the case and render the case less likely to be able to absorb the impact energy in subsequent impacts. Such embodiments may be useful when the impact energy may be very high.

In many embodiments, the protective case may have multiple mechanisms by which an electronic device. In addition to the deflection action, a protective case may operate by absorbing energy through compression of the protective case. Such embodiments may have foam or other materials that may absorb energy through compression. In some such embodiments, the energy absorbing material may be placed inside the protective case, while other embodiments may have an external cover or other compressive material located on the outside of the protective case.

Embodiment 100 illustrates a device 102 that may be protected by a case made up of a case portion 104 and case portion 106. The case portions 104 and 106 may be joined together by a case joint 108.

The device 102 may be any type of device that may be protected. In many embodiments, the device 102 may be an electronic device, such as a cellular telephone, tablet computer, laptop computer, hand held scanner, Global Positioning System navigation devices, athletic monitoring devices, music playing devices, or other devices. In many cases, the devices may have various user interface components, such as touchscreens, buttons, scroll wheels, tilt switches, push button switches, and other components. The devices may also include radio transceivers, receivers, satellite receivers, or other wireless components.

The case portions 104 and 106 are illustrated as surrounding the device 102. In many embodiments, the protective case may surround much of the device 102. Some embodiments may fully surround the device 102 and may permit access to the device through various buttons or other connections, while other embodiments may leave various access holes or other opening for direct access or contact to the device 102.

The protective case may contact the device 102 in various contact areas 110, 112, 114, and 116. The contact areas may be interference fits where the protective case may press against the device 102. In many embodiments, the contact areas may engage the device 102 and may prevent the device 102 from shifting during impact events.

In some embodiments, one or more of the contact areas 110, 112, 114, and 116 may engage a mechanical feature in the device 102. The mechanical feature may be a recess, protrusion, or other shaped feature that may mechanically engage the device 102.

In some embodiment, one or more of the contact areas 110, 112, 114, and 116 may be formed with a material that may be tacky or may resist slipping. In some such embodiments, a portion of one or more of the contact areas 110, 112, 114, and 116 may be formed with overmolded thermoplastic elastomer or other soft material. In some embodiments, portions of the contact areas may be fitted with foam or other compressible material that may fill any void between the protective case and the device 102 and assist in holding the device 102 inside the case.

Embodiment 100 illustrates an example of a rectangular device 102 that may have additional protection along the corners of the device 102. A protective case that may be designed to protect a device 102 against dropping or other trauma may have additional protection at the corners, as these areas are more likely to be damaged during a fall.

Each of the corners 118, 122, 126, and 130 may have an air gap 120, 124, 128, and 132, respectively. The air gap may give the case room to flex when subjected to an impact force.

The air gap may differ for various embodiments. In many cases, the air gap may be 0.005 in or larger. The air gap may be 0.010 in, 0.025 in, 0.050 in, or larger.

In many embodiments, the air gap and the spring action of the protective case may be sufficient to protect an electronic device from a fall of at least six inches or more. In many embodiments, the protective case may be capable of protecting the device from a fall of at least one foot, but some embodiments may protect the device from falls of two, three, four, or more feet.

Figure 2:
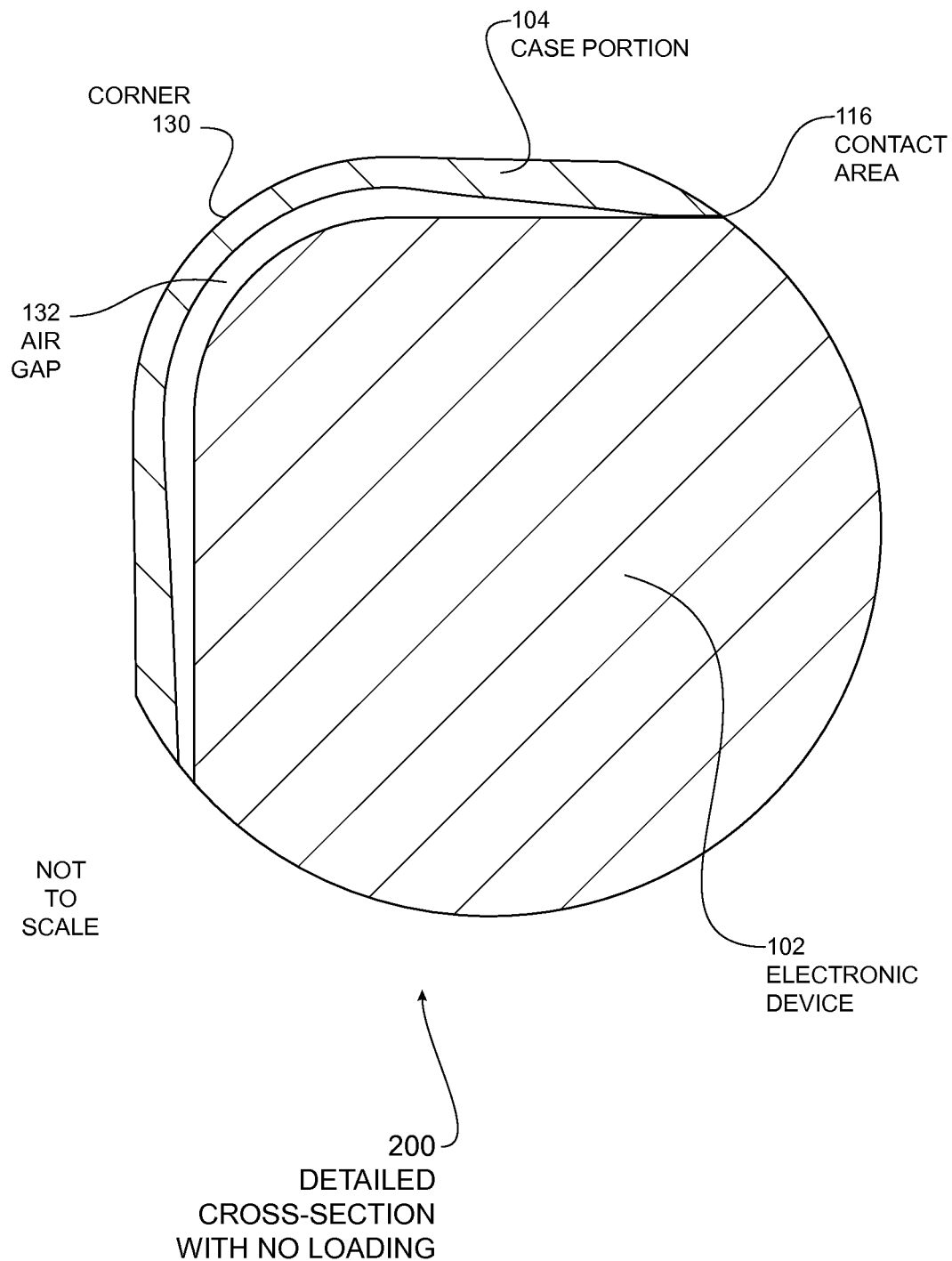
FIG. 2 is a cross-sectional illustration of a detailed view of the embodiment of FIG. 1.

FIG. 2 is a cross sectional diagram of an embodiment 200, showing a detailed view of the protective case of embodiment 100. FIG. 2 is not to scale. Embodiment 200 illustrates a detailed view of the corner 130 of embodiment 100.

Embodiment 200 illustrates the device 102 and the case portion 104. The contact area 116 may be to the right hand side of the illustration.

Embodiment 200 illustrates the air gap 132 in more detail than embodiment 100.

Figure 3:
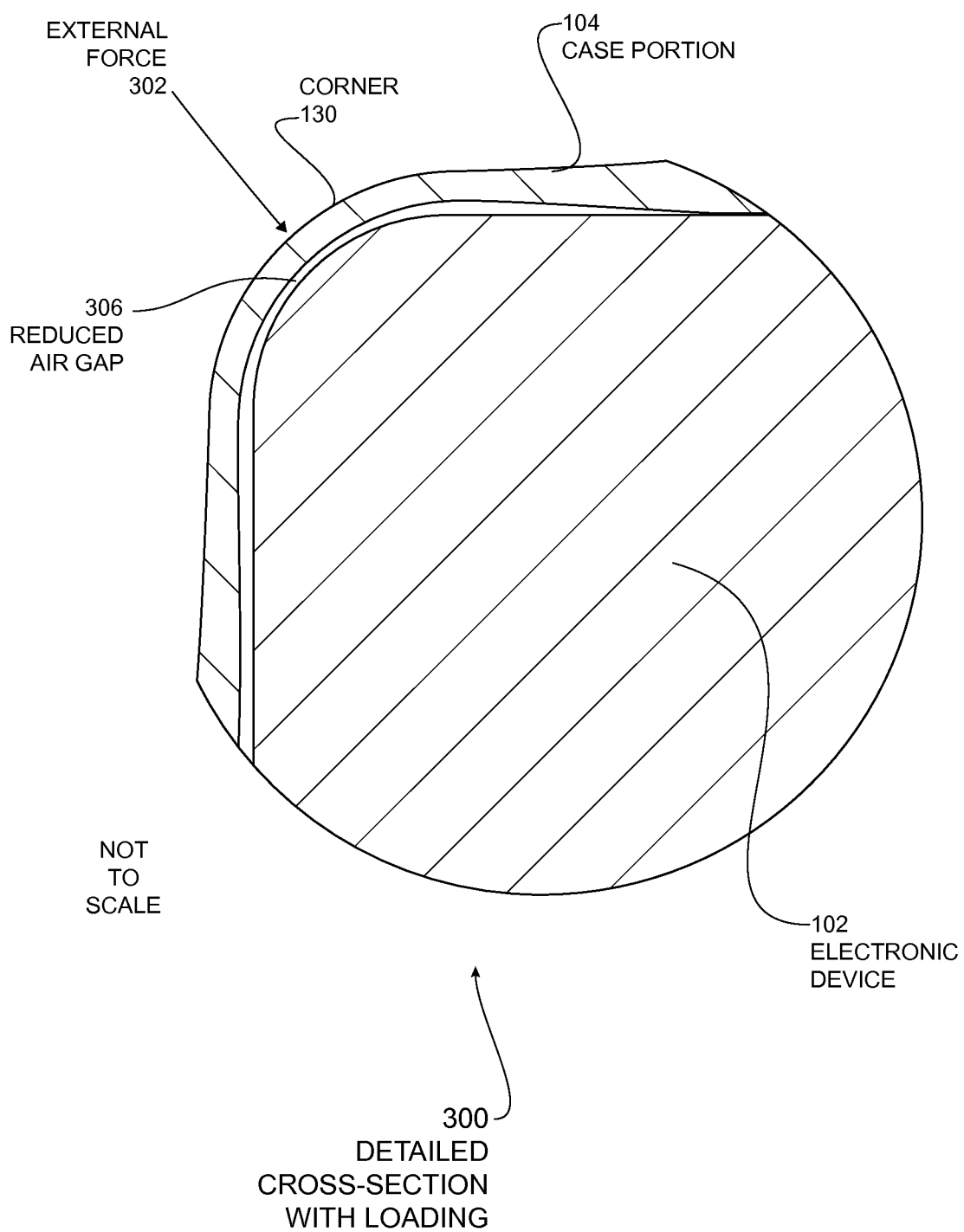
FIG. 3 is a cross-sectional illustration of a detailed view of the embodiment of FIG. 2 undergoing an external force.

FIG. 3 is a cross sectional diagram of an embodiment 300, showing a detailed view of the protective case of embodiment 200 when subjected to an external force. FIG. 3 is not to scale. Embodiment 300 illustrates a detailed view of the corner 130 of embodiments 100 and 200.

Embodiment 300 illustrates the device 102 and the case portion 104.

Embodiment 300 illustrates the deflection of the case portion 104 when subjected to an external force 302. Because of the external force 302, the case portion 104 may deflect, causing a reduced air gap 306. The deflection of the case portion 104 may absorb some or all of the external force 302 by translating the external force 302 into bending or torsional forces in the case portion 104.

Figure 4:
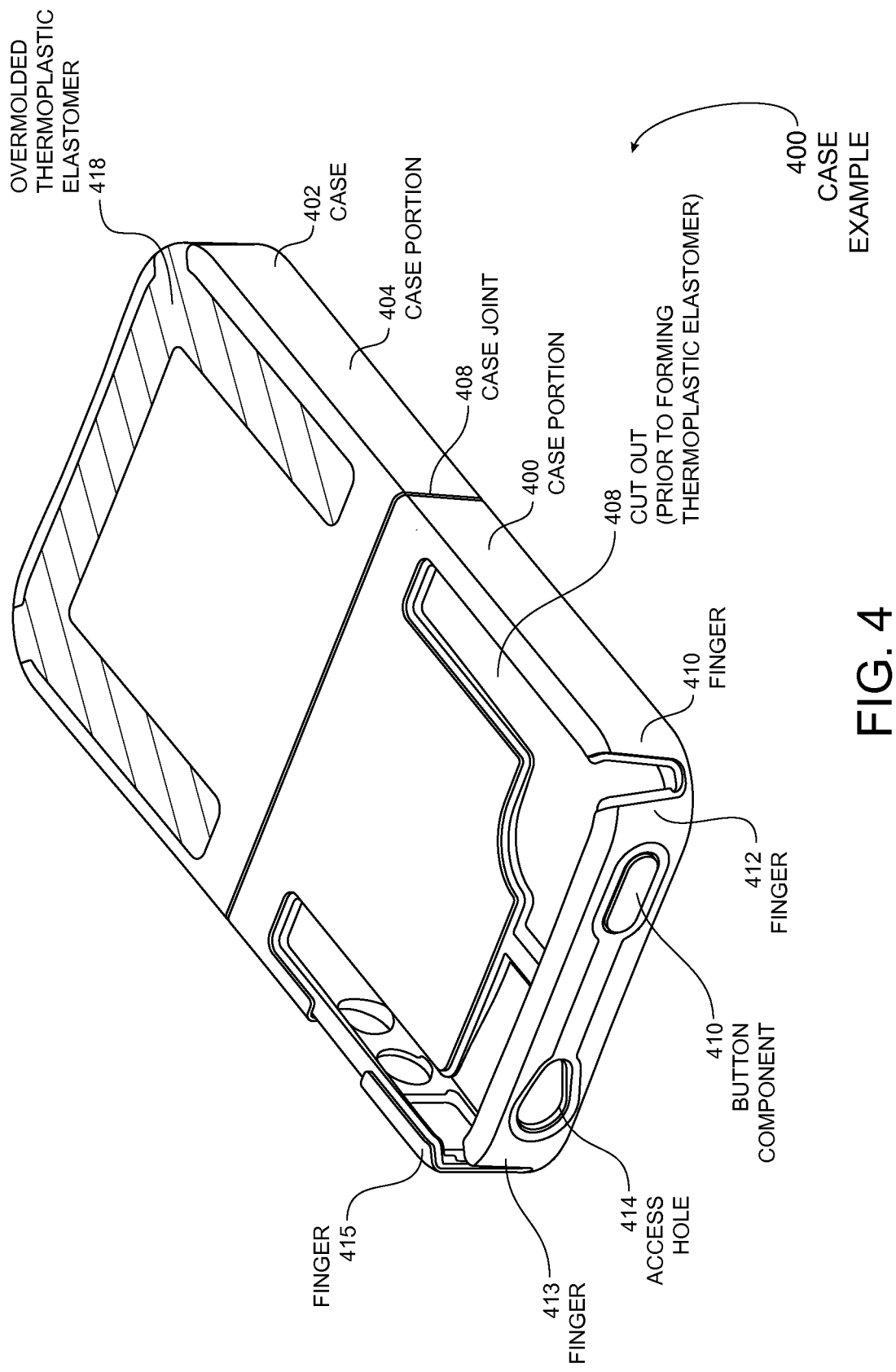
FIG. 4 is a perspective view of a first embodiment showing a protective case.

FIG. 4 is a perspective view of an embodiment 400, showing an example protective case. FIG. 4 is not to scale. Embodiment 400 illustrates a case 402 that may be used for protecting a device similar to a cellular telephone or portable music player.

The protective case 402 is illustrated as having case portions 404 and 406, which may be connected at a case joint 408. The case portions may be each capture one end of a device and may be joined by a snap feature.

The case portion 406 may have a cutout 408 which may be a through hole or slot through the case portion 406. In many embodiments, the case portion 406 may be manufactured from a hard plastic, such as a thermoplastic material such as ABS, PVC, polycarbonate, or other materials.

The cutout 408 may extend around the corner areas of the case portion 406 and may form fingers 410, 412, 413, and 415. The various fingers may be portions of the case portion 406 that may flex by a combination of bending and torsion to absorb impact forces that may be subjected to the case 402. The areas near the various fingers may have gaps between the case portion 406 and a device enclosed by the case 402.

In many embodiments, the cutout 408 may be filled using thermoplastic elastomer or other flexible material. By filling the cutout 408, the protective case may keep out dirt, lint, or other materials, as well as provide some aesthetic features to the case.

In some embodiments, the thermoplastic elastomer may be substantially more flexible and resilient than the hard plastic shell. For example, the thermoplastic elastomer may have a density of 50-60 Shore A, but may vary from 30 to 70 Shore A, while the rigid material in the protective case may have a hardness of 65 to 120 on the Rockwell scale for HDPE, acrylic, polypropylene, PVC, ABS, nylon, or other plastics.

Throughout this specification and claims, the term "thermoplastic elastomer" is used to refer to any type of flexible material that has the ability to stretch to moderate elongations and return to a shape close to its original shape. In many embodiments, the thermoplastic elastomer may be processable as a melt at elevated temperature. The term "thermoplastic elastomer" is intended to be a generic term for elastomer materials, and may refer to thermoset elastomers.

In general, thermoplastic elastomers may be a class of copolymers, which may be a mix of a plastic and a rubber, which consist of materials with both a thermoplastic and elastomeric properties. Thermoplastic elastomers may be processed by injection molding.

In many embodiments, a case portion may be manufactured by a two-shot molding process. In such a process, a hard plastic shell may be injection molded in the first step or shot, then the tooling may transport the shell to another molding cavity where a thermoplastic elastomer may be injection molded over the hard plastic shell.

In such embodiments, the thermoplastic elastomer may be joined to the hard plastic shell through the molding process, so that no additional assembly may be used. Examples of cross sections of the overmolded thermoplastic elastomer may be found later in this specification.

The case portion 404 may be illustrated as having overmolded thermoplastic elastomer 418, which may be overmolded to cover a cutout that may be similar to the cutout 408.

Figure 5:
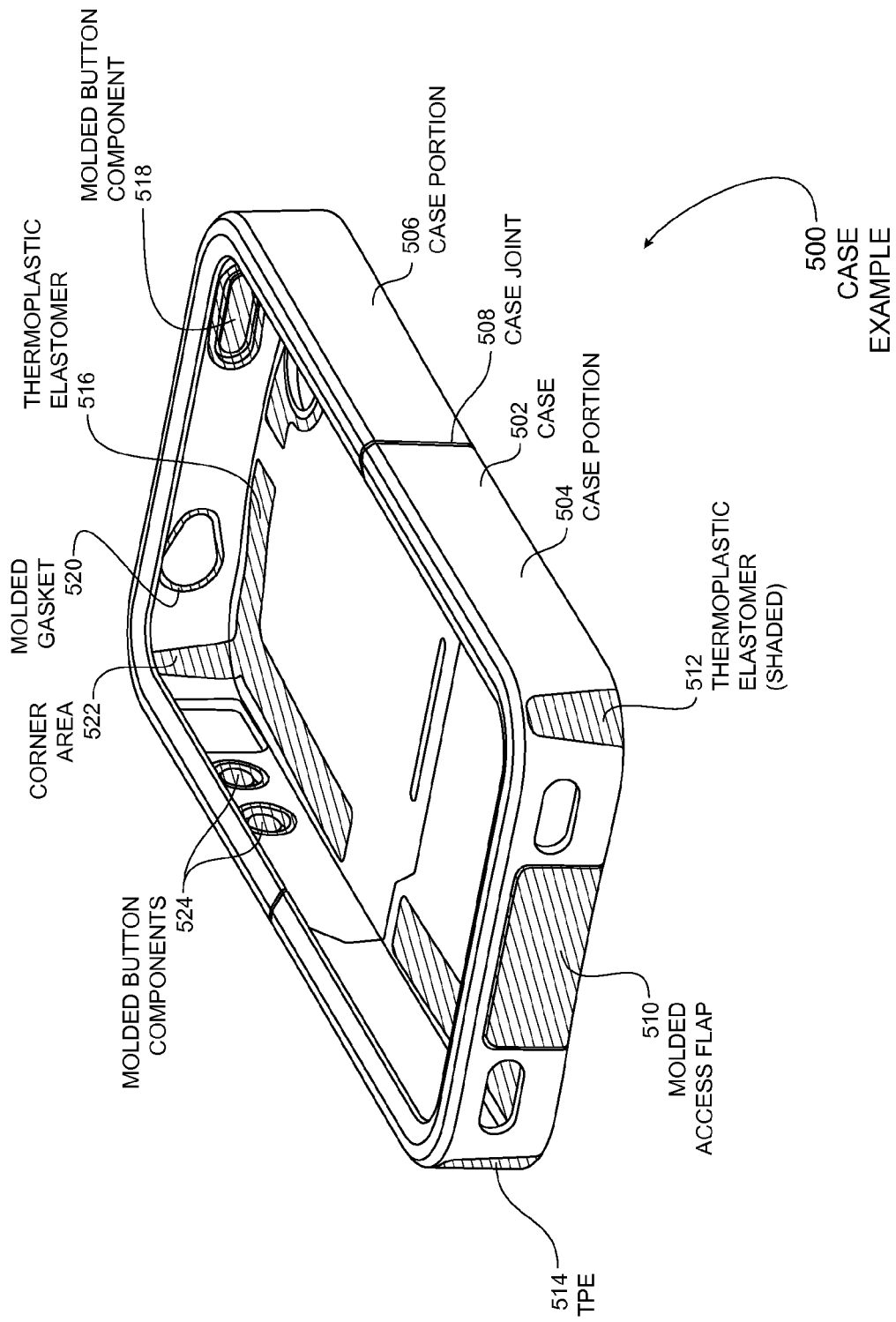
FIG. 5 is a perspective view of the embodiment of FIG. 4, shown from a second view.

FIG. 5 is a perspective view of an embodiment 500, showing a different view of the protective case of embodiment 400, but with the overmolded thermoplastic elastomer shown on both case portions. FIG. 5 is not to scale.

Embodiment 500 is a different perspective of the protective case of embodiment 400, illustrated without the electronic device. The case 502 is illustrated with case portions 504 and 506 and the case joint 508. The case portions 504 and 506 correspond with the case portions 406 and 404, respectively.

The case portion 504 is illustrated with shading showing the thermoplastic elastomer 512 and 514. The thermoplastic elastomer 512 and 514 illustrate the portion of the thermoplastic elastomer that fills a gap between the fingers formed in the hard plastic shell.

When forming the thermoplastic elastomer 512 and 514, various other features may be formed in the second shot of the two-shot molding process. For example, a molded access flap 510 may be formed in the same molding process and may be formed of thermoplastic elastomer. The molded access flap 510 may fit over a connector access port in the case portion 504.

Similarly, case portion 506 may include various features molded from a single shot of thermoplastic elastomer 516. The thermoplastic elastomer 516 may be formed over the cutout 408 as illustrated in embodiment 400 and may fill the corner area 522, for example.

The thermoplastic elastomer 516 may also be used to form molded button components 518 and 524, as well as a molded gasket 520.

Embodiment 500 illustrates an embodiment where a two-shot molding process may form a hard plastic shell over which a thermoplastic elastomer may form a cover for the various cutouts, as well as access covers, button actuators, gaskets, and other features.

Figure 6:
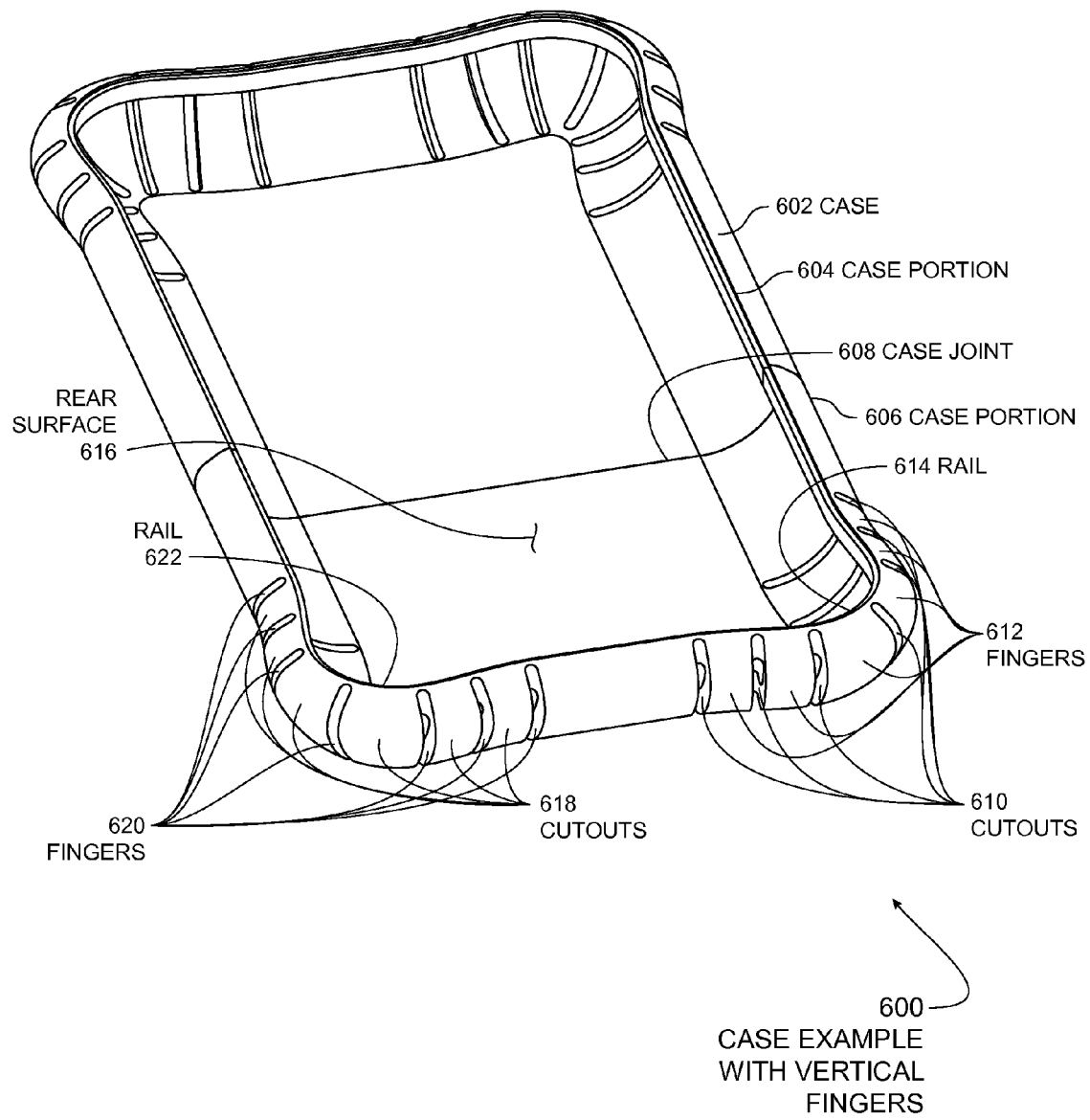
FIG. 6 is a perspective view of a second embodiment of a protective case.

FIG. 6 is a perspective view of an embodiment 600, showing another example of a protective case. Embodiment 600 illustrates a protective case with fingers that may be oriented from the front to the back of the protective case. Embodiment 600 is not to scale.

Embodiment 600 shows a case 602 that may be formed from case portions 604 and 606, which may be joined at a case joint 608.

In the lower corners, various cutouts 610 and 618 may form fingers 612 and 620. The fingers 612 and 620 may be attached to the rear surface 616 and the upper rail 614 and 622.

Embodiment 600 is merely one example of fingers or other features that may be placed in a corner area of a protective case, where the fingers may be spaced away from a device with a gap. The fingers may be designed to flex inwards when an external impact force is exerted against the case 602.

Figure 7:
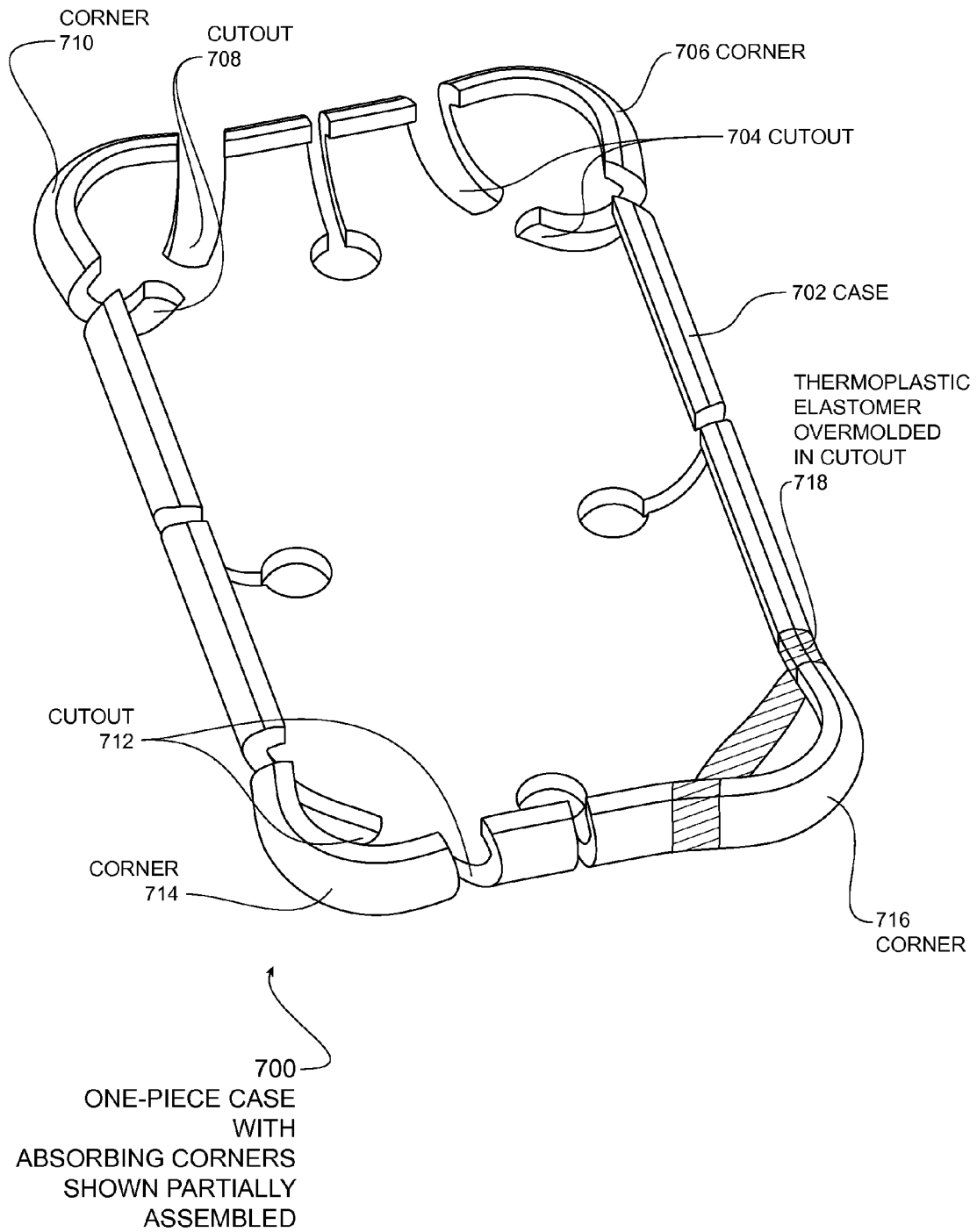
FIG. 7 is a perspective view of a third embodiment of a protective case.

FIG. 7 is a perspective view of an embodiment 700, showing yet another example of a protective case. Embodiment 700 illustrates a single piece protective case, where the protective case may snap over a device. Embodiment 700 is not to scale.

Embodiment 700 is a case 702 that is a single piece. Each corner element may be defined by a cutout, and the cutout may be overmolded with thermoplastic elastomer. The corners 706, 710, and 714 have cutouts 704, 708, and 712, respectively. The corners are each attached to the main body of the case 702 with a connector. The corner 716 is illustrated with thermoplastic elastomer 718 covering the corresponding cutout for the corner 716. A fully completed case may have thermoplastic elastomer molded over each of the cutouts 704, 708, and 712.

Figure 8:
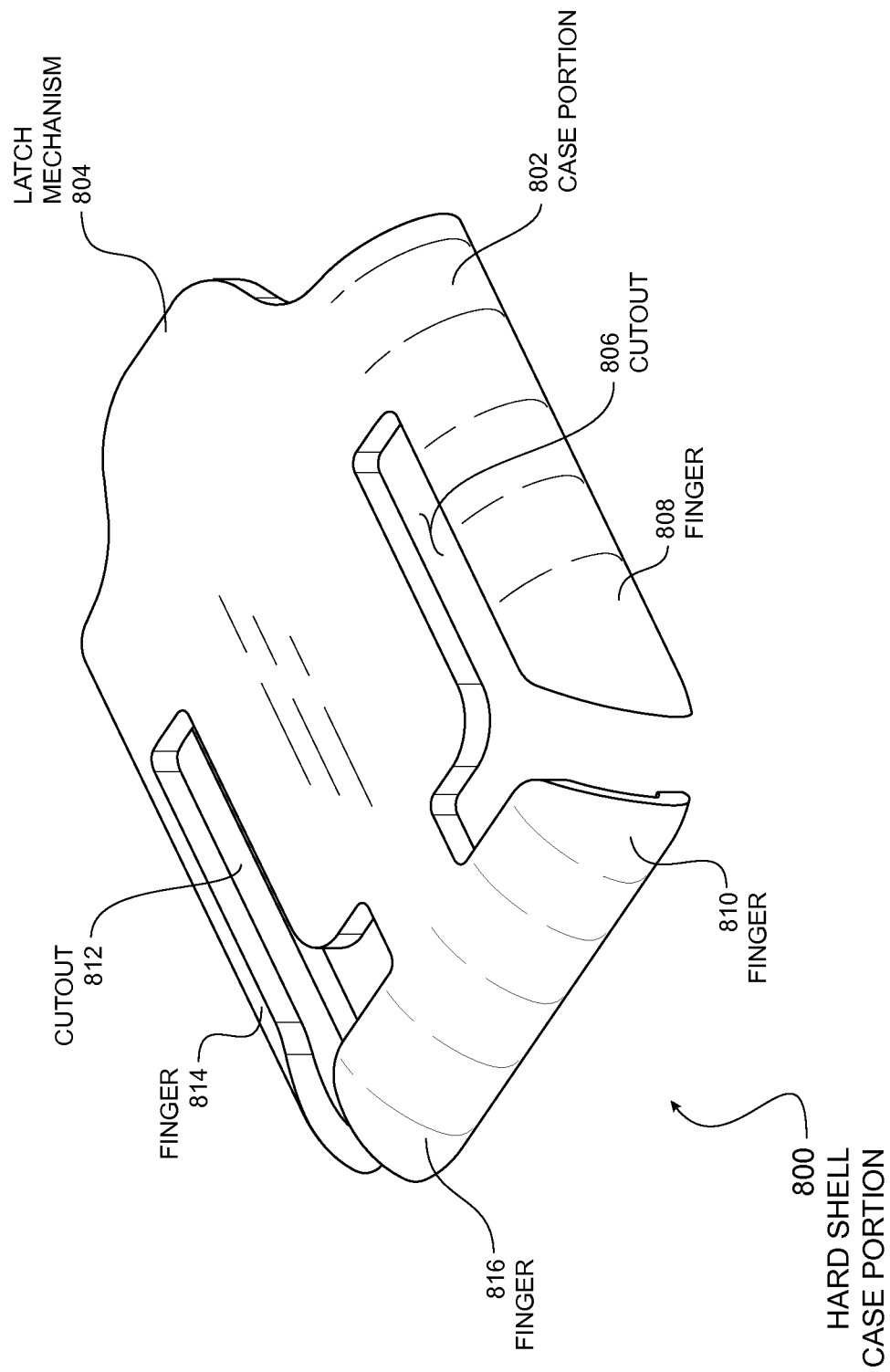
FIG. 8 is a perspective view of a fourth embodiment of a protective case.

FIG. 8 is a perspective view of an embodiment 800, showing still another example of a protective case. Embodiment 800 illustrates a case portion 802, which may be attached to another case portion with a latch or snap mechanism 804. Embodiment 800 is not to scale.

The case portion 802 may have cutouts 806 and 812 that may form fingers 808, 810, 814, and 816. The various fingers may be designed with a gap between the inside surface of the case portion 802 and an electronic device. The fingers may flex when impacted, thereby absorbing some impact force and lessening any damage that may be inflicted on a device installed inside the case portion 802.

The fingers 808 and 814 may have major axes that are parallel to the main axis of the protective case. The main axis of the protective case may be the centerline of the protective case in the longest dimension of the case. The major axes of the fingers 808 and 814 may be along the outside edges of the protective case and extend into or near the corner regions of the case.

Similarly, the fingers 810 and 816 may have major axes that are perpendicular to the main axis of the protective case. The major axes of the fingers 810 and 816 may also extend into the corner regions of the case. In many embodiments, the cutouts 806 and 812 may be filled with a membrane of thermoplastic elastomer or other flexible material.

Figure 9:
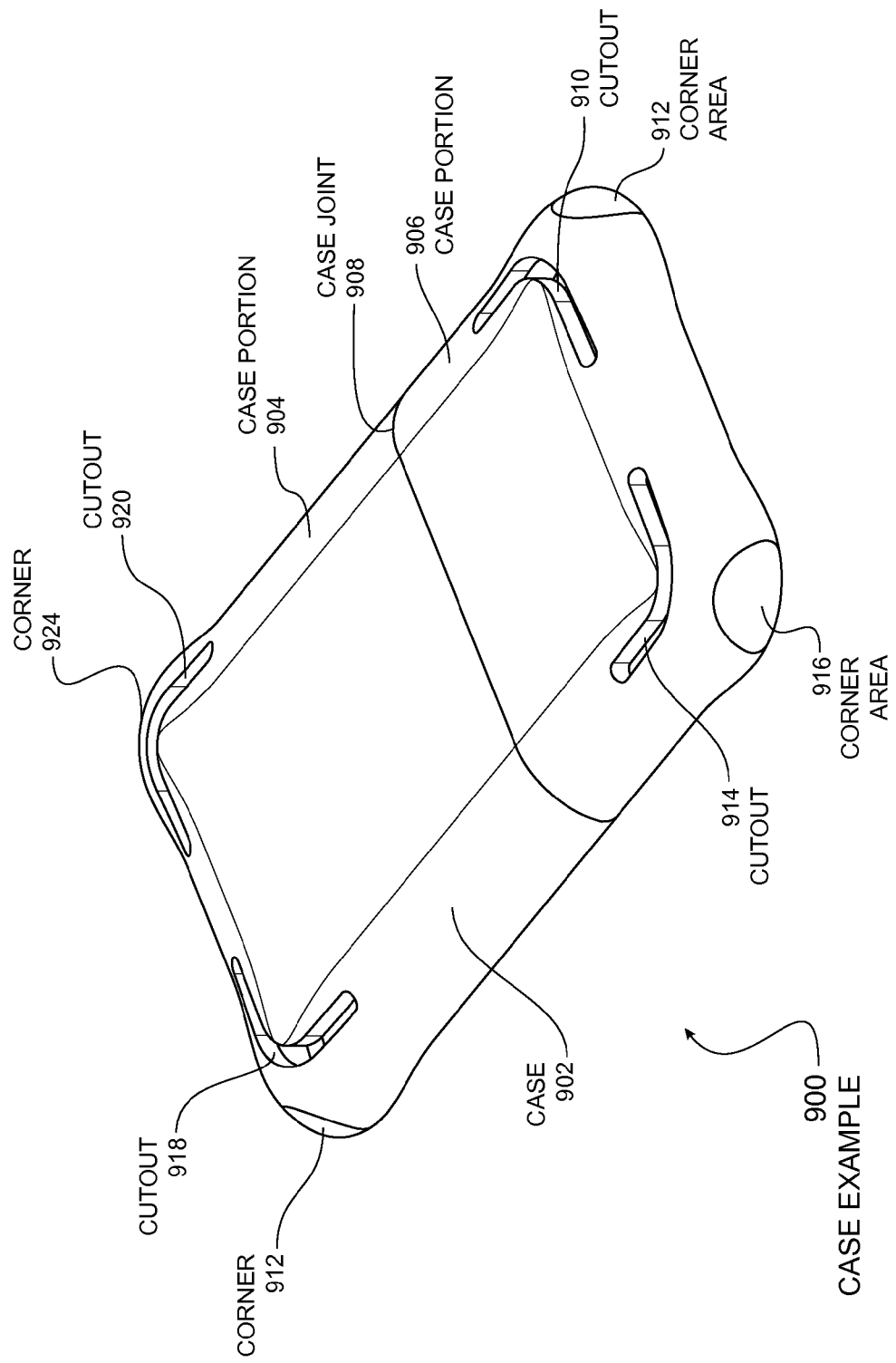
FIG. 9 is a perspective view of a fifth embodiment of a protective case.

FIG. 9 is a perspective view of an embodiment 900 showing yet another example of a protective case. Embodiment 900 illustrates a case 902 made up of case portions 904 and 906 which may be joined at a case joint 908.

The case 902 may have cutouts 910, 914, 918, and 920 at each of the corners 912, 916, 922, and 924, respectively. The various cutouts may allow the case to flex in the areas of the corners when impacted. The corners may be designed with a gap between the case and a protected device.

Figure 10:
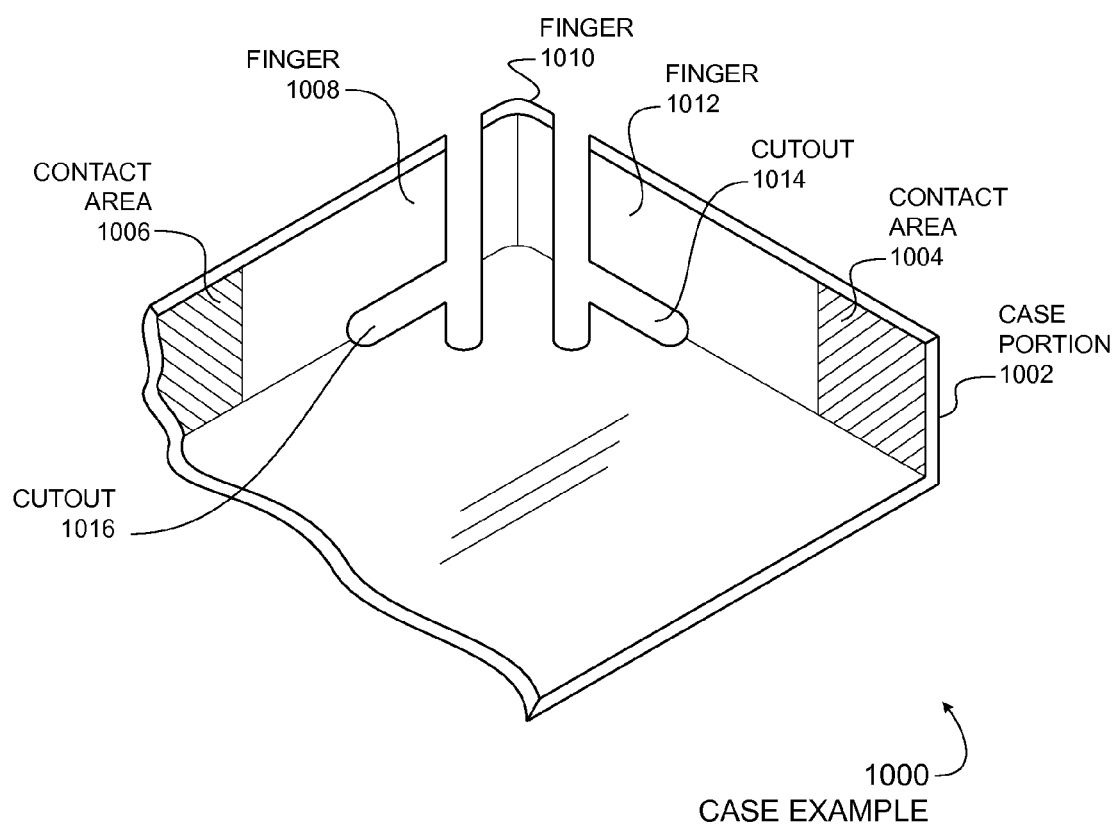
FIG. 10 is a perspective view of a sixth embodiment of a protective case.

FIG. 10 is a perspective view of an embodiment 1000 showing still another example of a protective case. Embodiment 1000 illustrates a section of a case portion 1002 showing a corner area. Embodiment 1000 is not to scale.

The case portion 1002 may have contact areas 1004 and 1006 that may contact a device using spring force, and may have fingers 1008, 1010, and 1012 that are formed from cutouts 1014 and 1014. The fingers may be designed to form a gap between the case portion 1002 that may be used to flex the fingers during impact and absorb impact energy.

Figure 11:
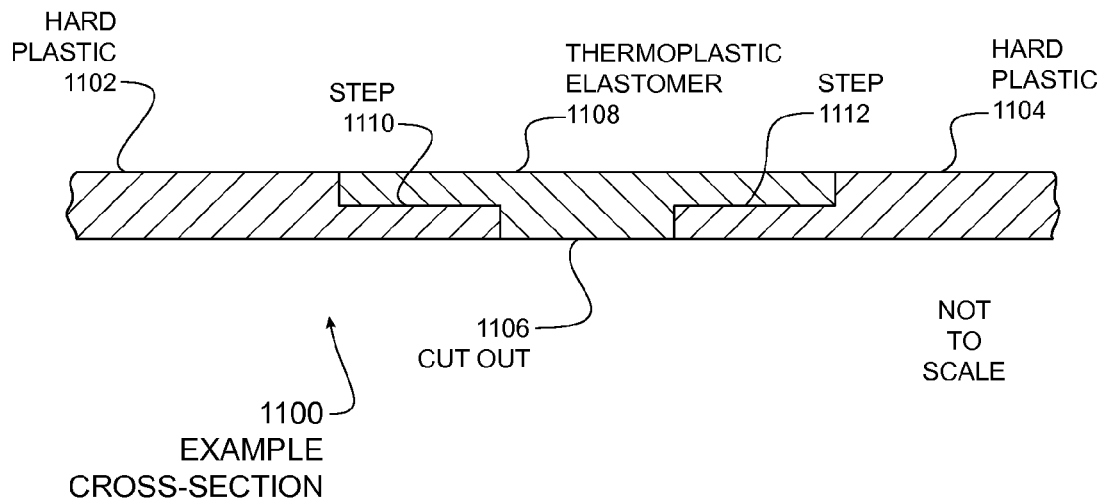
FIG. 11 is a cross-sectional view of an embodiment showing a cutout area.

FIG. 11 is a cross-sectional view of an embodiment 1100 showing a cross section through a cutout that has an overmolded thermoplastic elastomer. Embodiment 1100 is not to scale.

Embodiment 1100 shows two portions of a case that are hard plastic 1102 and 1104. Between the hard plastic portions is a cutout 1106. The cutout 1106 may be filled with a thermoplastic elastomer 1108, which may be joined to the hard plastic parts by steps 1110 and 1112. The steps may provide a large surface area for bonding the thermoplastic elastomer 1108 to the hard plastic parts 1102 and 1104.

Figure 12:
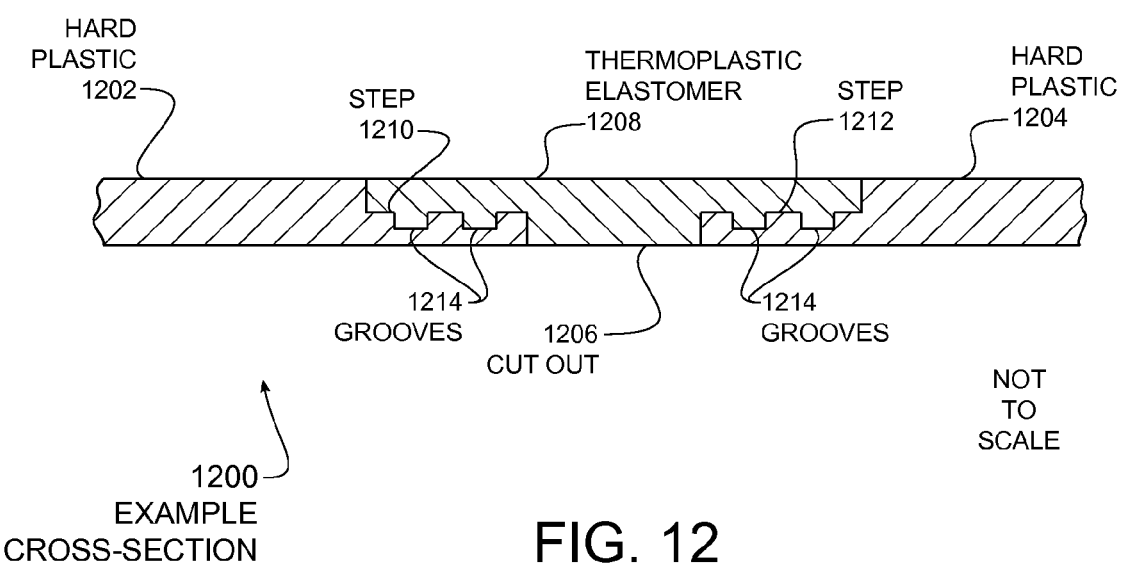
FIG. 12 is a cross-sectional view of a second embodiment showing a cutout area.

FIG. 12 is a cross-sectional view of an embodiment 1200 showing a second cross section through a cutout that has an overmolded thermoplastic elastomer. Embodiment 1200 is not to scale. Embodiment 1200 is similar to that of embodiment 1100, but with the addition of grooves or other features in the step area to increase surface area and provide mechanical bonding between the thermoplastic elastomer and the hard plastic components.

Embodiment 1200 shows two portions of a case that are hard plastic 1202 and 1204. Between the hard plastic portions is a cutout 1206. The cutout 1206 may be filled with a thermoplastic elastomer 1208, which may be joined to the hard plastic parts by steps 1210 and 1212. The steps may provide a large surface area for bonding the thermoplastic elastomer 1208 to the hard plastic parts 1202 and 1204.

Embodiment 1200 may have grooves 1212 and 1214 that may provide additional surface area and mechanical engagement between the thermoplastic elastomer 1208 and the hard plastic components 1202 and 1204.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A protective case for an electronic device, said protective case comprising:

two hard shell components configured to snap together to capture said electronic device by engaging said electronic device on at least three contact areas such that said electronic device does not shift with respect to said contact areas during an impact event;

said hard shell components having corners configured to each provide an air gap between said protective case and said electronic device, each corner configured to deflect toward said electronic device and reduce a size of said air gap when said corner is subjected to said impact event in order to protect said electronic device from damage from an external force associated with said impact event, said hard shell components remaining in contact with said electronic device in said contact areas, wherein said air gap is in excess of 0.010 in and said impact event is at least a one foot drop, at least one of said corners comprising an impact absorbing finger, a cutout area adjacent to said at least one corner, and a flexible membrane joined to a respective one of said hard shell components by molding said flexible membrane into a step having a step surface parallel to an external surface of the respective hard shell component.

2. The protective case of claim 1, said flexible membrane comprising thermoplastic elastomer.

3. The protective case of claim 2, at least one of said hard shell components being formed using a two-shot molding process.

4. The protective case of claim 1, said at least one of said corners having at least two impact absorbing fingers.

5. The protective case of claim 1 wherein the corners are further configured to generate a spring action in response to said impact event.

6. A protective case for an electronic device, said protective case comprising:

a plurality of hard shell components being fastened together to capture said electronic device as an assembled case;

said assembled case capturing said electronic device on at least three contact areas such that said electronic device does not shift with respect to said assembled case during an impact event;

said assembled case having flexible corner components configured to each provide an air gap between said assembled case and said electronic device and configured to flex when receiving said impact event to protect said electronic device from damage from said impact event while said assembled case contacts said electronic device in said contact areas, wherein said air gap is in excess of 0.010 in and said impact event is at least a one foot drop;

said hard shell components each comprising a cutout area and a flexible membrane in proximity to at least one of said flexible corner components, said flexible membrane comprising thermoplastic elastomer, said thermoplastic elastomer molded into a step having a step surface parallel to an external surface of the respective hard shell component; and said assembled case having at least one impact absorbing finger adjacent to a corner area of said protective case.

* * * * *